(12) United States Patent
Kurian et al.

(10) Patent No.: US 11,080,411 B2
(45) Date of Patent: Aug. 3, 2021

(54) ELASTIC VIRTUAL INFORMATION ACCESS ECOSYSTEM

(71) Applicant: Bank of America Corporation, Charlotte, NC (US)

(72) Inventors: Manu Kurian, Dallas, TX (US); Linda Haddad, Concord, CA (US); Thomas J. Durkin, Chicago, IL (US)

(73) Assignee: Bank of America Corporation, Charlotte, NC (US)

( * ) Notice: Subject to any disclaimer, the term of this patent is extended or adjusted under 35 U.S.C. 154(b) by 212 days.

(21) Appl. No.: 16/524,112

(22) Filed: Jul. 28, 2019

(65) Prior Publication Data
US 2021/0026974 A1    Jan. 28, 2021

(51) Int. Cl.
*G06F 21/60* (2013.01)
*G06F 21/62* (2013.01)

(52) U.S. Cl.
CPC ........ *G06F 21/604* (2013.01); *G06F 21/6209* (2013.01); *G06F 2221/2111* (2013.01); *G06F 2221/2137* (2013.01); *G06F 2221/2143* (2013.01)

(58) Field of Classification Search
CPC .... G06F 21/60; G06F 21/604; G06F 21/6209; G06F 2221/2111; G06F 2221/2117; G06F 2221/2137; G06F 2221/2141; G06F 2221/2143
See application file for complete search history.

(56) References Cited

U.S. PATENT DOCUMENTS

| | | | |
|---|---|---|---|
| 8,601,270 B2 | 12/2013 | Dupré | |
| 8,863,299 B2* | 10/2014 | Sharma | H04L 9/0822 726/26 |
| 9,942,578 B1* | 4/2018 | Vantalon | H04N 21/262 |
| 10,803,011 B2* | 10/2020 | Sundaramoorthy | G06N 20/00 |
| 10,812,590 B2* | 10/2020 | Sloane | H04L 63/083 |
| 2006/0021006 A1* | 1/2006 | Rensin | H04L 63/14 726/2 |
| 2014/0108649 A1* | 4/2014 | Barton | H04W 8/18 709/224 |
| 2015/0163228 A1 | 6/2015 | Li | |
| 2015/0302216 A1* | 10/2015 | Kurian | G06F 21/6209 726/28 |
| 2015/0302220 A1* | 10/2015 | Cismas | G06F 21/10 707/783 |

(Continued)

*Primary Examiner* — Richard A McCoy
(74) *Attorney, Agent, or Firm* — Weiss & Arons LLP; Michael A. Springs, Esq.

(57) ABSTRACT

Apparatus and methods securely limiting access to a document segment. The apparatus may include a use-zone definition engine. The use-zone may include a zone in which authorized individuals may engage in activity regarding a document segment that is designated for use in the zone. The zone may be defined based on zone parameters such as geographic coordinates or network domains. The apparatus may include a use-zone instancing engine. The instancing engine may be configured to attach to the segment an executable program corresponding to the use-zone. The executable program may be configured to verify that the segment is inside the zone and that the user is authorized to be in the zone. The executable program may be configured to destroy a copy of the segment residing on a device registered to the user.

14 Claims, 6 Drawing Sheets

(56) References Cited

U.S. PATENT DOCUMENTS

| | | | |
|---|---|---|---|
| 2015/0339497 A1* | 11/2015 | Kurian | G06F 21/6218 |
| | | | 726/34 |
| 2016/0044040 A1* | 2/2016 | Caffary, Jr. | H04L 63/20 |
| | | | 726/4 |
| 2017/0147828 A1* | 5/2017 | Kurian | G06F 21/6218 |
| 2017/0147829 A1* | 5/2017 | Cismas | G06F 21/6218 |
| 2017/0195335 A1* | 7/2017 | Kurian | H04L 63/102 |
| 2018/0302227 A1 | 10/2018 | Seegebarth | |
| 2020/0134203 A1* | 4/2020 | Kurian | G06F 21/335 |

* cited by examiner

ELASTIC VIRTUAL INFORMATION ACCESS ECOSYSTEM

BACKGROUND

Typical electronic data rooms hold a universe of documents in one or more folders or subfolders. Individuals are credentialed based on the folders. An individual may be prevented from "checking out" a document to work on it, but the typical electronic data room does not provide a scalable zone within which the individual can operate on or transmit the document. The typical electronic data room cannot be defined by physical parameters, such as geographic location, or telecommunication parameters, such as a data service provider.

Therefore, it would be desirable to provide apparatus and methods for securely limiting access to a document segment.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION

Apparatus and methods for securely limiting access to a document segment are provided.

The apparatus may include a use-zone definition engine. The use-zone may include a zone in which authorized individuals may engage in activity regarding a document segment that is designated for use in the zone. The activities may include, reading, revising, executing, witnessing or any other document-related activity. The zone may be defined based on zone parameters. Illustrative zone parameters are set forth in Table 1.

TABLE 1

| Illustrative zone parameters. | |
| --- | --- |
| Illustrative zone parameters | |
| Illustrative category | Illustrative parameter |
| Spatial | Latitude/longitude coordinates defining a polygon |
| | Zip code |
| | City limits (e.g., based on a gps or mapping application) |
| | Building |
| | Campus |
| Temporal | Start time/end time |
| | Start date/end date |
| | N-day period, starting at inception of zone |
| | M-month period starting at inception of zone |

TABLE 1-continued

| Illustrative zone parameters. | |
| --- | --- |
| Illustrative zone parameters | |
| Illustrative category | Illustrative parameter |
| Telecommunication | Authorized data service provider |
| | Authorized sender machine |
| | Authorized network (including, e.g., vpn) |
| | Authorized wireless router (WIFI network) |
| | Authorized MAC address |
| | Authorized Bluetooth device |
| Any other suitable categories | Any other suitable parameters |

The definition engine may be configured to define a use-zone for the document segment. Table 2 lists illustrative documents.

TABLE 2

| Illustrative documents |
| --- |
| Illustrative documents |
| Agreements |
| Algorithms and other mathematical formulae |
| Artwork |
| Budgets and financial statements |
| Business information |
| Business plans |
| Charts |
| Computer programs |
| Customer lists |
| Data |
| Databases |
| Designs |
| Discoveries |
| Distributor lists |
| Documentation |
| Formulas |
| Government certificates |
| Human resource information |
| Images |
| Information regarding plans for research |
| Insurance policies |
| Inventory information |
| Licenses |
| Marketing and selling |
| Mask works |
| Notes |
| Outlines |
| Prices and costs |
| Programs |
| Real estate transactional documents |
| Regulatory approval |
| Reports |
| Representations |
| Source and object codes |
| Supplier lists |
| Term sheets |
| Warranties |
| Any other suitable document |

The documents may be in electronic form. The documents may be encrypted. The documents may be password-protected.

A document segment may include an entire document. The document segment may include a portion of the document that does not include the entire document. Table 3 lists illustrative segments.

TABLE 3

Illustrative segments.
Illustrative segments

Entire document
Annex
Exhibit
Appendix
Paragraph
Section
Title
Addressee
Date
Preamble
Signature block
Any other suitable segment The apparatus may include a use-zone instancing engine. The use-zone instancing engine may be configured to identify the segment. The instancing engine may be configured to attach to the segment an executable program corresponding to the use-zone.

The executable program may be configured to verify that the segment is inside the zone. The executable program may be configured to verify that the user is authorized to be in the zone. The executable program may be configured to verify both: that the segment is inside the zone; and that the user is authorized for the zone. The executable program may be configured to disverify (fail to verify or verify non-authorization) that the segment is inside the zone. The executable program may be configured to disverify that the user is authorized to be in the zone. The executable program may be configured to disverify both: that the segment is inside the zone; and that the user is authorized for the zone. The executable program may be configured to destroy a copy of the segment residing on a device registered to the user.

The methods may include a method for securely limiting access to a document segment. The method may include defining a use-zone for the document segment. The method may include attaching to the segment an executable program corresponding to the use-zone. The executable program may be configured to verify both: that the segment is inside the zone; and that the user is authorized for the zone. The executable program may be configured to; upon disverification of either, destroy a copy of the segment residing on a device registered to the user.

The executable code may be configured to collect zone status data upon attempted access to the segment by the user. The executable code may be configured to transmit the zone status data to an elastic zone management platform. The executable code may be configured to receive a disposition instruction from the zone management platform based on a comparison between the zone status data and parameters of the use-zone. The disposition instruction may include an instruction to delete the segment from a registered device of the user. The disposition instruction may include an instruction to provide the user with a verification exception. The exception may provide the user with an opportunity to override the disverification. The override may require that the user provide a password or code. The instruction may include an instruction to provide to disable the segment. The instruction may include an instruction to corrupt the segment.

The method may include seeding the document with use-zone parameters. The executable code may be configured to determine that there is a mismatch between the zone status data and the use-zone parameters. The executable code may be configured to destroy the segment.

The zone status data may include a device unique telephone identifier. The identifier may include an International Mobile Equipment Identity ("IMEI"). The identifier may include a Mobile Equipment Identifier ("MEID"). The identifier may include an Electronic Serial Number ("ESN"). The identifier may include a Machine Access Address ("MAC"). The identifier may include any other suitable identifier.

The executable code may be configured to cause an email server on which a sender is registered to insert a code corresponding to the segment in a header of an email sent from the server and to which the segment is attached.

The zone status data may include header information from an email to which the segment was attached.

The zone status data may include network service provider information from an email to which the segment was attached.

The defining may include setting a use-zone parameter.

The use-zone parameter may include a start time. The use-zone parameter may include an end time. The use-zone parameter may include an arc of latitude. The use-zone parameter may include an arc of longitude. The use-zone parameter may include an IP address. The use-zone parameter may include a network service provider identifier. The use-zone parameter may include a geographic location identifier.

Illustrative embodiments of apparatus and methods in accordance with the principles of the invention will now be described with reference to the accompanying drawings, which form a part hereof. It is to be understood that other embodiments maybe utilized and that structural, functional and procedural modifications or omissions may be made without departing from the scope and spirit of the present invention.

Figure 1:
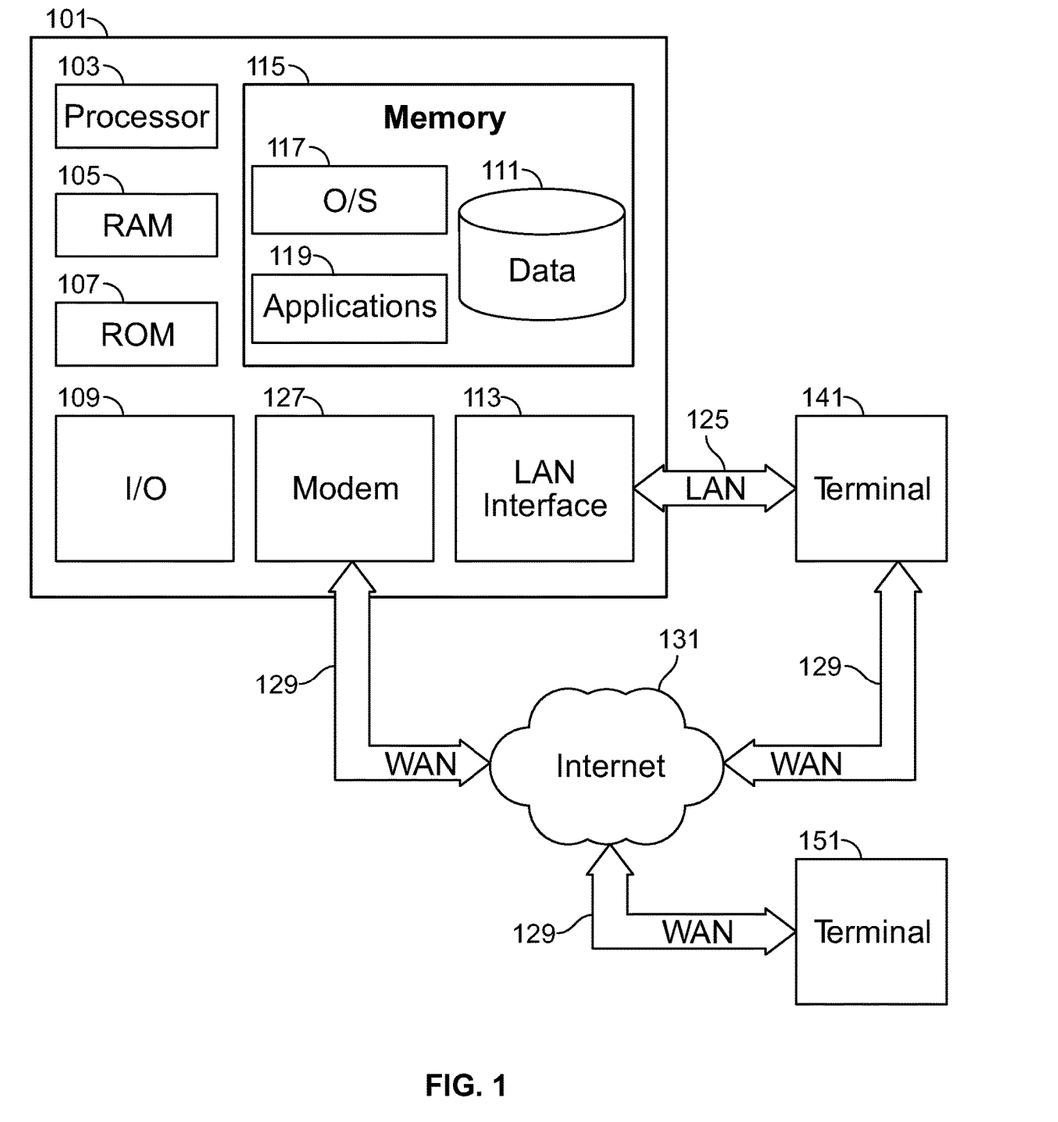
FIG. 1 shows illustrative apparatus that may be used in accordance with principles of the invention.

FIG. 1 is a block diagram that illustrates a computing device 101 (alternatively referred to herein as a "server or computer") that may be used in accordance with the principles of the invention. The computer server 101 may have a processor 103 for controlling overall operation of the server and its associated components, including RAM 105, ROM 107, input/output ("I/O") module 109, and memory 115.

I/O module 109 may include a microphone, keypad, touchscreen and/or stylus through which a user of device 101 may provide input, and may also include one or more of a speaker for providing audio output and a video display device for providing textual, audiovisual and/or graphical output. Software may be stored within memory 115 and/or other storage (not shown) to provide instructions to processor 103 for enabling server 101 to perform various functions. For example, memory 115 may store software used by server 101, such as an operating system 117, application programs 119, and an associated database 111. Alternatively, some or all of computer executable instructions of server 101 may be embodied in hardware or firmware (not shown).

Server 101 may operate in a networked environment supporting connections to one or more remote computers, such as terminals 141 and 151. Terminals 141 and 151 may be personal computers or servers that include many or all of the elements described above relative to server 101. The network connections depicted in FIG. 17 include a local area network (LAN) 125 and a wide area network (WAN) 129, but may also include other networks.

When used in a LAN networking environment, computer 101 is connected to LAN 125 through a network interface or adapter 113.

When used in a WAN networking environment, server 101 may include a modem 127 or other means for establishing communications over WAN 129, such as Internet 131.

It will be appreciated that the network connections shown are illustrative and other means of establishing a communications link between the computers may be used. The existence of any of various well-known protocols such as TCP/IP, Ethernet, FTP, HTTP and the like is presumed, and the system may be operated in a client-server configuration to permit a user to retrieve web pages from a web-based server. Any of various conventional web browsers may be used to display and manipulate data on web pages.

Additionally, application program 119, which may be used by server 101, may include computer executable instructions for invoking user functionality related to communication, such as email, short message service (SMS), and voice input and speech recognition applications.

Computing device 101 and/or terminals 141 or 151 may also be mobile terminals including various other components, such as a battery, speaker, and antennas (not shown). Terminal 151 and/or terminal 141 may be portable devices such as a laptop, tablet, smartphone or any other suitable device for receiving, storing, transmitting and/or displaying relevant information.

Any information described above in connection with database 111, and any other suitable information, may be stored in memory 115. One or more of applications 119 may include one or more algorithms that may be used to perform the functions of one or more of the use-zone definition engine, and/or perform any other suitable tasks.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 2:
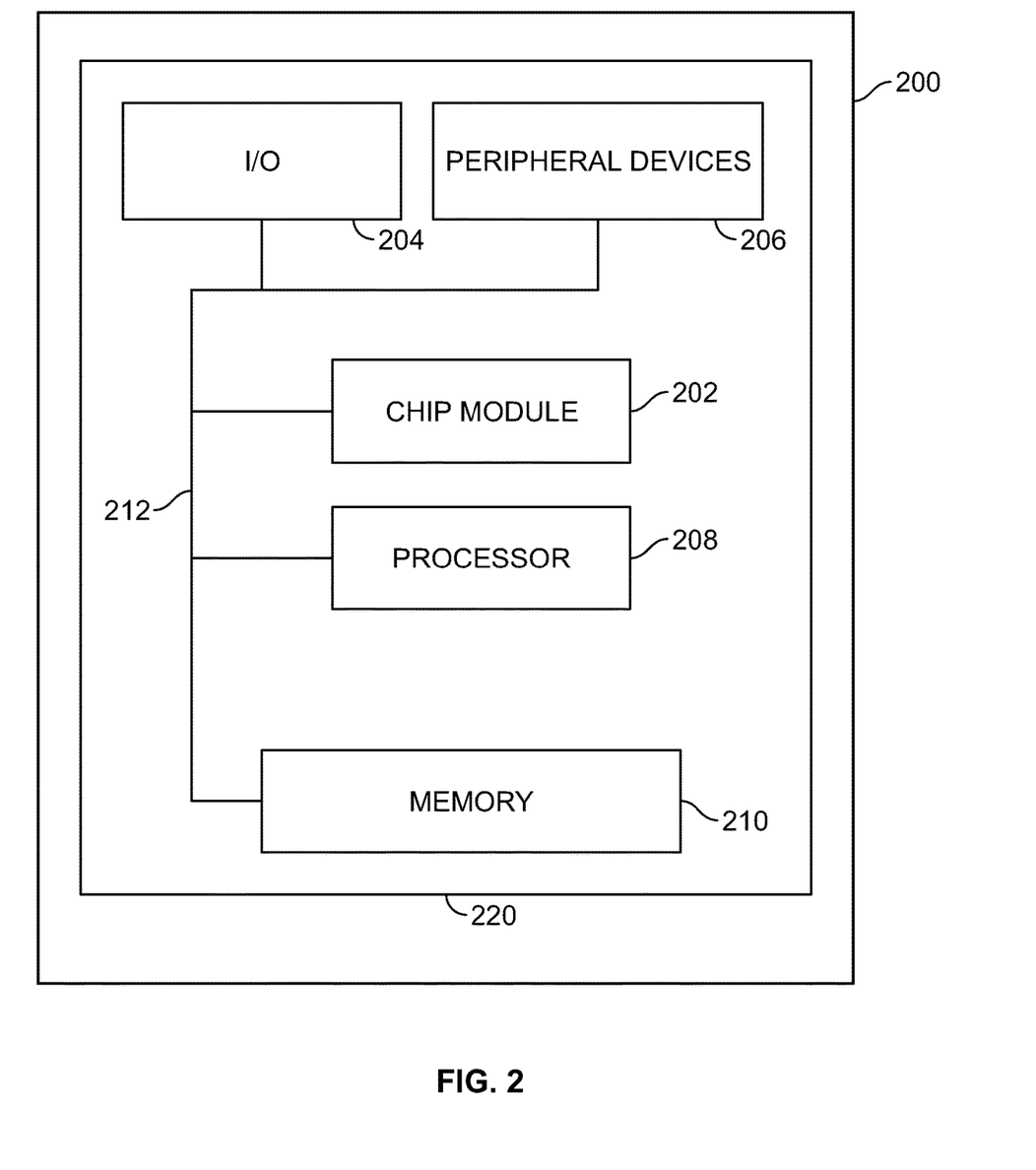
FIG. 2 shows illustrative apparatus that may be used in accordance with principles of the invention.

FIG. 2 shows an illustrative apparatus 200 that may be configured in accordance with the principles of the invention.

Apparatus 200 may be a computing machine. Apparatus 200 may include one or more features of the apparatus that is shown in FIG. 1.

Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable encoded media or devices; peripheral devices 206, which may include counter timers, real-time timers, power-on reset generators or any other suitable peripheral devices; logical processing device 208, which may define a use-zone for the document segment, attach to the segment an executable program corresponding to the use-zone; verify that the segment is inside the zone and that the user is authorized for the zone; destroy a copy of the segment residing on a device registered to the user; and perform other methods described herein; and machine-readable memory 210.

Machine-readable memory 210 may be configured to store in machine-readable data structures: tokens, patterns, codes, executor registration information, super-executor registration information, co-executor registration information and any other suitable information or data structures.

Components 202, 204, 206, 208 and 210 may be coupled together by a system bus or other interconnections 212 and may be present on one or more circuit boards such as 220. In some embodiments, the components may be integrated into a single chip.

The chip may be silicon-based.

Figure 3:
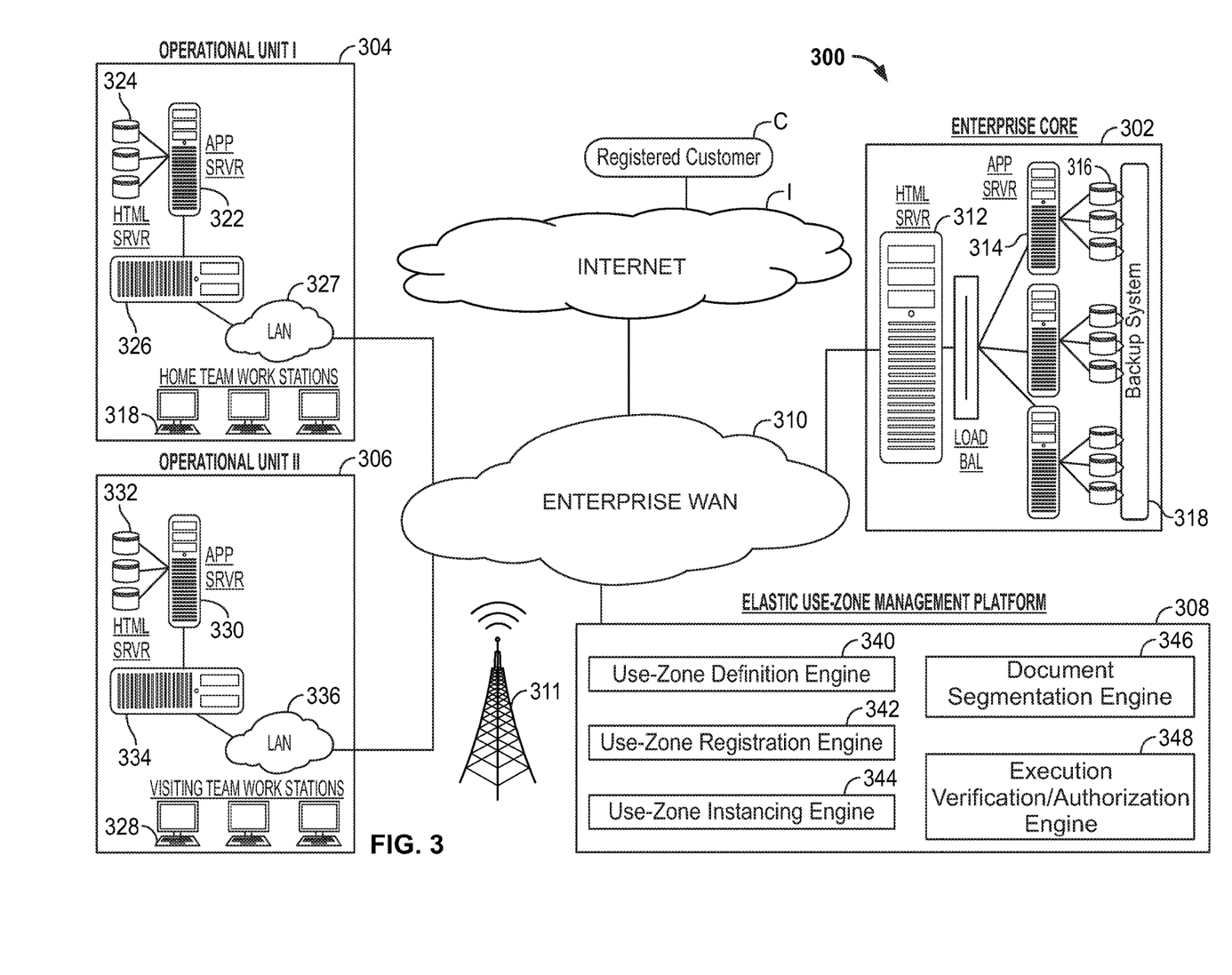
FIG. 3 shows illustrative apparatus in accordance with principles of the invention.
Figure 4:
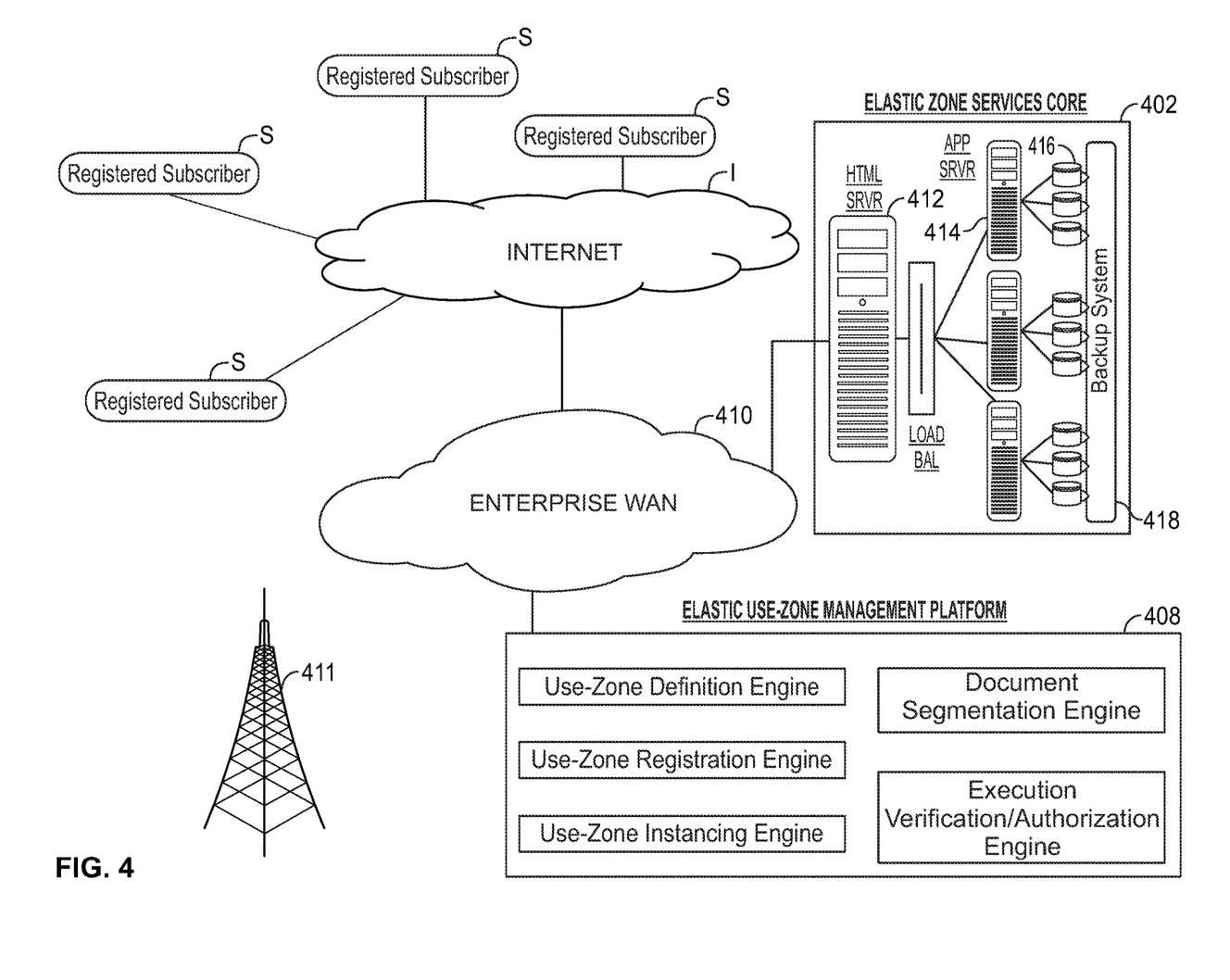
FIG. 4 shows illustrative apparatus in accordance with principles of the invention.

FIGS. 3-4 show illustrative architectures that may include one or more of the features show in or described in connection with FIGS. 1 and 2.

FIG. 3 shows illustrative architecture 300 for securely limiting access to a document segment. Architecture 300 may include enterprise core 302. Architecture 300 may include enterprise operational unit 304. Architecture 300 may include enterprise operational unit 306. Architecture 300 may include elastic use-zone management platform 308. Architecture 300 may include enterprise WAN 310. Registered customer C may be in communication with WAN 310 via internet I. Architecture 300 may include access to cellular communication network 311.

Enterprise core 302 may include server 312 for exchanging use-zone related information. Use-zone related services may be provided by one or more applications served by application servers 314. Servers 314 may exchange applications and data with machine readable memory in data stores 316. Data stores 316 may be backed up by backup system 318.

Enterprise operational unit 304 may provide retail or business-to-business services to registered customer C. Unit 304 may include one or more "home team" workstations 318. A home team is a team that "hosts" other teams in a project in which the other teams "visit" the home team's "document room." Customer C may be the "visiting team." A visiting tema is a team that visits the home team's "document room."

In some instances, customer C may be the home team, and units 304 and 306 may be "visiting teams." Home team workstations 318 may be provided to members of the home team. The home team may use the apparatus and methods to define a use-zone, register document segments and individuals to the use-zone, and initiate or create an instance of a use-zone. The instance may be defined by the parameters of the use-zone. The document segments, individuals, and use-zone parameters may be created an application served by application server 322. Server 322 may exchange document information with data stores 324. HTML server 326 may provide the team with views of the document segments and suitable forms and data for establishing the use-zone. Elements in operational unit 304 may be interconnected through LAN 327.

Enterprise operational unit 306 may provide infrastructure for a visiting team to visit the use-zone established by operational unit 304. Unit 306 may include one or more visiting team workstations 328. Workstations 328 may be provided to visiting team members. A visiting team member may receive a document segment using an application served by application server 330. Server 330 may exchange document information with data stores 332. HTML server 334 may provide the visiting team member with the document segment and suitable forms and data for executing the document. Elements in operational unit 306 may be interconnected through LAN 336.

Any of the workstations may be mobile. The mobile devices may be in wireless communication with cellular network 311. Cellular network 311 may be in wireless connection with one or both of WAN 310 and platform 308.

Platform 308 may include use-zone definition engine 340. Platform 308 may include use-zone registration engine 342. Platform 308 may include use-zone instancing engine 344. Platform 308 may include document segmentation engine 346. Platform 308 may include execution verification/authorization engine 348.

The members of the home and visiting teams may be distributed geographically. Both home and visiting team members may be present at one or more of the operational units, such as 304 and 306.

FIG. 4 shows illustrative architecture 400 for securely limiting access to a document segment. Architecture 400 may include elastic use-zone services core 402. Architecture 400 may include elastic use-zone management platform 408. Architecture 400 may include elastic use-zone services WAN 410. Registered subscribers S may be in communication with WAN 410 via internet I. Architecture 400 may include access to cellular communication network 411.

Use-zone services core 402 may include server 412 for use-zone execution related information. Use-zone services may be provided by one or more applications served by application servers 414. Servers 414 may exchange applications and data with machine readable memory in data stores 416. Data stores 416 may be backed up by backup system 418.

Use-zone services core 402 may provide use-zone instances to registered subscribers S. Registered subscribers S may designate documents, document segments, home team members, and visiting team members. Registered subscribers S may include one or more home team workstations (not shown). Registered subscribers S may include one or more visting team workstations (not shown). A home team member may upload a document for use-zone services to core 402. Core 402 may provide to the home team document forms and other suitable forms for securely sharing segments of the documents with the visiting teams.

The home team members and visiting team members may be distributed geographically. Both home team members and visiting team members may be present at one or more of subscribers S.

Each executors of subscribers S may have a registered device (not shown). The device may be in wireless communication with cellular network 411. Cellular network 411 may be in wireless connection with platform 408.

Platform 308 may include use-zone definition engine 340. Platform 308 may include use-zone registration engine 342. Platform 308 may include use-zone instancing engine 344. Platform 308 may include document segmentation engine 346. Platform 308 may include execution verification/authorization engine 348.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

For the sake of illustration, the steps of the illustrated processes will be described as being performed by a "system." The "system" may include one or more of the features of the apparatus that are shown in FIGS. 1-4 and/or any other suitable device or approach. The "system" may include one or more means for performing one or more of the steps described herein.

The steps of methods may be performed in an order other than the order shown and/or described herein. Embodiments may omit steps shown and/or described in connection with illustrative methods. Embodiments may include steps that are neither shown nor described in connection with illustrative methods.

Illustrative method steps may be combined. For example, an illustrative method may include steps shown in connection with another illustrative method.

Figure 5:
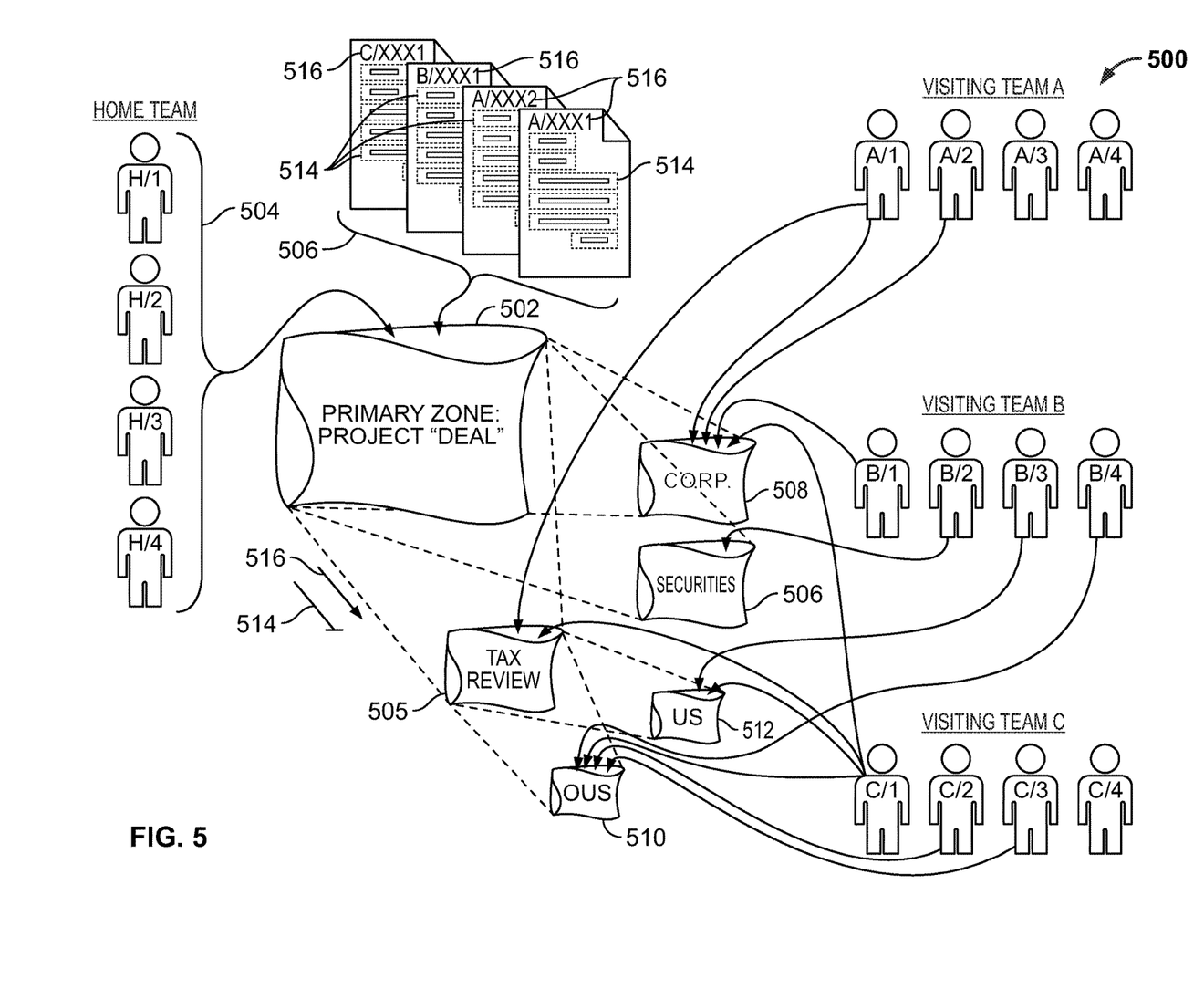
FIG. 5 shows an illustrative arrangement in accordance with principles of the invention.

FIG. 5 shows illustrative arrangement 500 for implementing a use-zone. Arrangement 500 may include primary zone 502.

Arrangement 500 may include home team 504. Arrangement 500 may include visiting team A. Arrangement 500 may include visiting team B. Arrangement 500 may include visiting team C.

Arrangement 500 may include documents 506.

Primary zone 502 may be defined by one or more zone parameters. Secondary zone 505 may be defined by one or more zone parameters. Secondary zone 506 may be defined by one or more zone parameters. Secondary zone 508 may be defined by one or more zone parameters. Tertiary zone 510 may be defined by one or more zone parameters. Tertiary zone 512 may be defined by one or more zone parameters. A tertiary zones may be an "elastic" extension of part or all of a secondary zone. A secondary zone may be an elastic extension of part or all of the primary zone. "Elastic" means that the higher order zone may "snap back" into the lower order zone. The home team may use one or more conditions based on zone parameters to preprogram the snap-back. The home team may manually snap the higher order zone back into the lower order zone at an arbitrary time. The elastic feature is based on the definition of the zones. One of symbols 514 and 516 may be associated with the extension of a lower order zone to a higher order zone. Symbol 514 indicates that a higher order zone that extends from a lower order zone is not open to team members admitted to the lower order zone without express authorization. Symbol 516 indicates that a higher order zone that extends from a lower order zone is open to team members admitted to the lower order zone without express authorization.

Home team 504 members are designated by "H" and a unique member number, for example, "H/1." In arrangement 500, all members of home team 504 are authorized to enter primary zone 502 and higher order zones extending therefrom. Visiting team members are designated by the team letter ("A," "B," or "C") and a unique team member number, for example, "B/1."

In arrangement 500, Team A member A/1 is admitted to secondary zone 505 and secondary zone 508. Team member A/2 is admitted only to secondary zone 508. Team B member B/1 is admitted only to secondary zone 508. Member B/2 is admitted only to secondary zone 506. Member B/3 is admitted only to tertiary zone 512. Member B/4 is admitted only to tertiary zone 510. Team C member C/1 is admitted to secondary zone 508, secondary zone 505, tertiary zone 512, and tertiary zone 510. Members C/2 and C/3 are admitted to tertiary zone 510. Members A/3, A/4 and C/4 are not admitted into any use-zones.

In arrangement 500, documents 506 include segments 514. Each document includes an identifier 516 that indicates the team that owns the document, and is responsible for registering the segments of the document, and the unique document number for that team (e.g, "C/XXX1" is the document number 1 for Team C). Each of segments 514 may be uniquely identified within each document. Each segment may be designated by its owner for use in one or more of the use-zones, including the primary zone and one or more secondary or tertiary zones.

Figure 6:
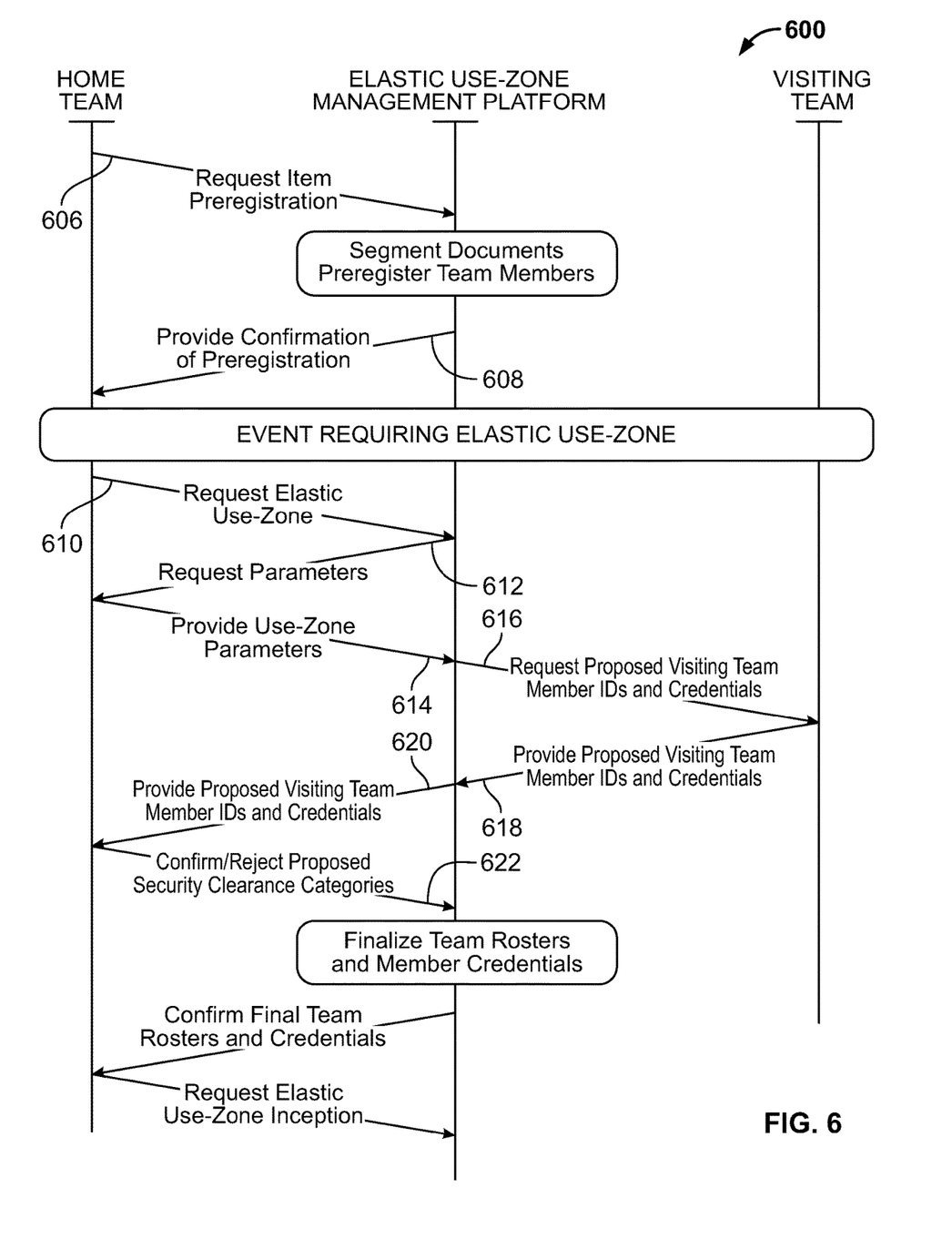
FIG. 6 shows illustrative communication in accordance with principles of the invention.

FIG. 6 shows illustrative sequence 600 of communications, which embodies methods in accordance with the principles of the invention. The communications may include communications between (a) the home team and an elastic use-zone management platform; and (b) the visiting team and the elastic use-zone management platform.

In communication 606, the home team may transmit to the platform a request for item preprocessing. The items may include documents and team members that the home team anticipates placing into a use-zone. The platform may segment the documents and preregister team members. Segmentation and preregistration may not yet be linked to one or more zones. In communication 608, the platform may confirm the preregistration. An event may then occur that requires one or more elastic use-zones. The event may be a decision to engage in document exchange with a visiting team. In response to the event, the home team may in communication 610 request an elastic use-zone. In communication 612, the platform may request that the home team provide use-zone parameters. In communication 614, the home team may provide the use-zone parameters.

In communication 616, the platform may request that the visiting team propose its member roster, including member identifiers. The platform may provide the visiting team with an outline of the home team's use-zones. The platform may request that the visiting team propose credentials for each member. The proposed credentials may indicate which team members are to be admitted into which use-zones. The platform may request that the visiting team identify documents to be placed in each use-zone. The visiting team documents may include segmented documents. The segments may be registered to one or more use-zones. The visiting documents may include unsegmented documents. The unsegmented documents may be registered to one or more use-zones.

In communication 618, the visiting team may provide to the platform proposed visiting team member IDs and credentials. In communication 620, the platform may forward teh visiting team member IDs and credentials to the home team.

In communication 622, the home team may confirm or reject the visiting team's proposed members, credentials, or both.

The platform may then iterate with the home team and the visiting team as necessary to finalize the team rosters and credentials of each member.

The platform may then provide to the home team (and to the visiting team (not shown)) confirmation of the final team rosters and member credentials.

The use-zone parameters may be provided to the visiting team.

The use-zone parameters may be not provided to the visiting team.

When the use-zone parameters are not provided to the visiting team, the platform may provide a portal for the visiting team to view, interact with, and transmit document segments to or from a work zone. The portal may limit the visiting team's activities to those within the use-zone parameters.

The home team may then request inception of the elastic use-zone.

Inception (not shown) may be performed by the instancing engine. The instancing engine may attach the executable program to each of the segments. The instancing engine may seed the document segments with the use-zone parameters.

The instancing engine may then provide team members with links to the document segments. A team member may then use the document segments in the use-zones to which the member has access. The executable code and the use-zone parameters may prevent the segment from exiting the use-zone for which it was designated.

If document execution is required, the platform may provide for verification of a signatory's identification sufficiency of signatory authority. This may be performed by the execution verification/authorization engine.

As will be appreciated by one of skill in the art, the invention described herein may be embodied in whole or in part as a method, a data processing system, or a computer program product. Accordingly, the invention may take the form of an entirely hardware embodiment, an entirely software embodiment or an embodiment combining software, hardware and any other suitable approach or apparatus.

Thus, methods and apparatus for securely limiting access to a document segment have been provided. Persons skilled in the art will appreciate that the present invention may be practiced by other than the described embodiments, which are presented for purposes of illustration rather than of limitation. The present invention is limited only by the claims that follow.

What is claimed is:

1. A system for securely limiting access to a plurality of documents each having a plurality of segments, the system comprising:

a processor and a memory coupled to the processor, the memory comprising a use-zone definition software engine, a use zone instancing software engine, and instructions that when executed by then processor cause:

the use-zone definition software engine to:

define a plurality of teams, each team comprising a plurality of users, wherein each team and each user is associated with a unique id, each of the unique id used to uniquely identify a respective one of the plurality of teams or plurality of users;

define the plurality of documents, each document associated with only one of the plurality of teams indicated as an owning team, the each respective document associated with the respective unique id of the respective owning team to establish the respective owning team;

for each document of the plurality of documents, define by the respective owning team a plurality of segments each associated with a segment id, each of the segment ids used to uniquely identify a
respective segment wherein each of the plurality
of segments is a unique portion of and comprised
by the each document;
define a plurality of use-zones, for each of the
plurality of use-zones:
define a first set of one or more parameters from
a spatial category including a designation of a
building,
define a second set of one or more parameters
from a temporal category,
define a third set of one or more parameters from
a communications category, and
define the first, second, and third sets of one or
more parameters as use-zone parameters,
whereby the use-zone parameters determine conditions governing document related activities
and constraints thereof that a user is authorized
to perform on a document segment;
for each of the plurality of segments of each of the
plurality of documents:
associate, by the respective owning team, the each
segment with one or more of the plurality of
use-zones;
for each of the plurality of users:
receive user credentials that identify the each user,
receive mobile device information for uniquely
identifying a mobile device to be used by the
user,
receive a proposed association between the each
user and each of one or more pairs, each pair
including one of the plurality of segments and
one of the associated one or more of the plurality of use-zones;
for each of the proposed associations,
receive an acceptance of or receive a rejection of,
from a member of the respective owning team of
the segment within the respective proposed pair,
the proposed association;
and the use-zone instancing software engine to:
for each of the mobile devices identifiable by the
received mobile device information:
provide an executable program to the each mobile
device,
receive from the respective executable program,
user credentials from a using user upon using
the each mobile device,
provide a copy of one or more segments to the
each mobile device;
attach the respective provided executable program
to each of the provided copies of the one or
more segments;
wherein the respective executable program is configured to:
upon each attempted access to any of the provided copies by the using user using the mobile
device,
collect zone status characterizing the attempted
access,
determine applicable use-zones by using the
segment id of the any of the provided copies to
identify corresponding use-zones previously
associated with the corresponding segment,
from which the any of the provided copies was
copied,
for each applicable use-zones, perform a comparison on between the collected zones status
data and each the respective associated defined
use-zone parameters to verify both:
that the attempted access to the any of the
provided copies is compliant with the each
applicable use-zone including that the mobile
device being used to access the any of the
provided copies is located inside the building;
and
that the using user was the each user of an
accepted proposed association between the each
user and at least one pair, the at least one pair
including:
the any of the provided copies and
at least one of the each applicable use-zones;
and, upon disverification of either, destroy the
any of the provided copies residing on the
respective each of the mobile devices.

2. A method for securely limiting access to a plurality of documents each having a plurality of segments, the method comprising:
defining a plurality of teams, each team comprising a
plurality of users, wherein each team and each user is
associated with a unique id, each of the unique ids used
to uniquely identify a respective only one of the plurality of teams or plurality of users;
defining the plurality of documents, each document associated with only one of the plurality of teams indicated
as an owning team, the each respective document
associated with the respective unique id of the respective owning team to establish the respective owning
team;
for each document of the plurality of documents, defining
by the respective owning team of a plurality of segments each associated with a segment id, each of the
segment ids used to uniquely identify a respective
segment wherein each of the plurality of segments is a
unique portion of and comprised by the each document;
defining a plurality of use-zones, for each of the plurality
of use-zones:
defining a first set of one or more parameters from a
spatial category including a designation of a building,
defining a second set of one or more parameters from
a temporal category,
defining a third set of one or more parameters from a
communications category, and
defining the first, second, and third sets of one or more
parameters as use-zone parameters,
whereby the use-zone parameters determine conditions
governing document related activities and constraints thereof that a user is authorized to perform
on a document segment;
for each of the plurality of segments of each of the
plurality of documents;
associating, by the respective owning team, the each
segment with one or more of the plurality of usezones;
for each of the plurality of users:
receiving user credentials that identify the each user,
receiving mobile device information for uniquely identifying a mobile device to be used by the user,
receiving a proposed association between the each user
and each one of the one or more pairs, each pair
including one of the plurality of segments and one of
the associated one or more of the plurality of usezones;
for each of the proposed associations, receiving an acceptance of or receiving a rejection of, from a member of the respective owing team of the segment within the respective proposed pair, the proposed association;

for each of the mobile devices identifiable by the received mobile device information:
  providing an executable program to the each mobile device,
  receiving from the respective executable program, user credentials from a using user upon using the each mobile device,
  providing a copy of one or more segments to the each mobile device;
  attaching the respective provided executable program to each of the provided copies of the one or more segments;
  wherein the respective executable program is configured to:
    upon each attempted access to any of the provided copies by the using user using the mobile device, collect zone status characterizing the attempted access,
    determine applicable use-zones by the segment id of the any of the provided copies to identify corresponding use-zones previously associated with the corresponding segment, from which the any of the provided copies was copied,
    for each applicable use-zones, perform a comparison between the collected zone status data and each the respective associated defined use-zone parameters to verify both:
      that the attempted access to the any of the provided copies is compliant with the each applicable use-zone including that the mobile device being used to access the any of the provided copies is located inside the building; and
      that the using user was the each user of an accepted proposed association between the each user and at least one pair, the at least one pair including
        the any of the provided copies and
        at least one of the each applicable use zones;
    and, upon disverification of either, destroy the any of the provided copies residing on the respective each of the mobile devices.

3. The method of claim 2 wherein the executable code is further configured to: transmit the respective collected zone status data to an elastic zone management platform; and receive a disposition instruction from the zone management platform based on a comparison between the zone status data and parameters of the use-zone.

4. The method of claim 2 wherein the respective collected zone status data includes a device unique telephone identifier.

5. The method of claim 2 wherein the executable code is further configured to cause an email server on which a sender is registered to insert a code corresponding to one of the plurality of segments in a header of an email sent from the server and to which the segment is attached.

6. The method of claim 2 wherein the respective collected zone status data includes header information from an email to which one of the plurality of segments was attached.

7. The method of claim 2 wherein the respective collected zone status data includes network service provider information from an email to which one of the plurality of segments was attached.

8. The method of claim 2 wherein the respective use-zone parameters of each of the plurality of use-zones includes a start time.

9. The method of claim 8 wherein the respective use-zone parameters of each of the plurality of use-zones includes an end time.

10. The method of claim 2 wherein the respective use-zone parameters of each of the plurality of use-zones includes an arc of latitude.

11. The method of claim wherein the respective use-zone parameters of each of the plurality of use-zones includes an arc of longitude.

12. The method of claim 2 wherein the respective use-zone parameters of each of the plurality of use-zones includes an IP address.

13. The method of claim 2 wherein the respective use-zone parameters of each of the plurality of use-zones includes a network service provider identifier.

14. The method of claim 2 wherein the respective use-zone parameters of each of the plurality of use-ones includes a geographic location identifier.

* * * * *